United States Patent [19]
Morrison

[11] Patent Number: 5,040,752
[45] Date of Patent: Aug. 20, 1991

[54] WIRE MANAGEMENT CLIP

[75] Inventor: Andrew I. Morrison, Setauket, N.Y.

[73] Assignee: Knoll International, New York, N.Y.

[21] Appl. No.: 302,048

[22] Filed: Jan. 25, 1989

Related U.S. Application Data

[63] Continuation of Ser. No. 914,133, Oct. 1, 1986, abandoned.

[51] Int. Cl.⁵ .............................................. F16B 15/00
[52] U.S. Cl. ....................................... 248/71; 248/74.2
[58] Field of Search ............... 248/71, 73, 74.2, 231.9, 248/316.7, 510, 507; 24/532, 305, 339, 336, 297, 17 AP

[56] References Cited

U.S. PATENT DOCUMENTS

| | | | |
|---|---|---|---|
| 2,231,153 | 2/1941 | Camiener | 248/231.9 |
| 2,723,432 | 11/1955 | Flora | 248/73 X |
| 3,015,869 | 1/1962 | Rapata | 248/73 |
| 3,126,184 | 3/1964 | Kropp | 248/73 |
| 4,279,396 | 7/1981 | Bendock | 248/316.7 X |
| 4,342,438 | 8/1982 | Speedie | 248/73 |
| 4,509,710 | 4/1985 | Cooper | 248/73 |

Primary Examiner—J. Franklin Foss
Attorney, Agent, or Firm—Thomas A. O'Rourke

[57] ABSTRACT

A wire management clip for use in connection with pre-formed openings in a surface including for use on the underside of a work surface, the clip having a base and a resilient arm extending from the base. The resilient arm retains wires in close proximity to the underside of the work surface. The wire management clip also includes a projection having a series of spaced apart flanges thereon for gripping the inner surface of the opening in the surface.

4 Claims, 2 Drawing Sheets

WIRE MANAGEMENT CLIP

This is a continuation of application Ser. No. 06/914,133 filed on Oct. 1, 1986; now abandoned.

BACKGROUND OF THE INVENTION

As the power needs of the workplace burgeon, there is an increased need to provide a means of providing a visually attractive work station, whereby the various electrical, telephone, computer, and other necessary electrical wires may be kept out of the employees' way, and yet remain accessible if the need arises. Various approaches to wire management include running the wires from the floor through the pedestal to the work surface as disclosed in U.S. Pat. No. 4,094,256 to Holper. An alternative approach is disclosed in U.S. Pat. No. 3,635,174 to Ball.

The approach to wire management taken by Holper and Ball provides a visually attractive and uncluttered work station provided the arrangement of equipment is such that wires do not traverse the upper surface of the work station. An alternative approach is disclosed in U.S. Pat. No. 4,372,629 to Propst, whereby the patentee provides a slot in the surface of the work station and a wire raceway within the slot for the laying of wires. The unsightly wires are hidden by means of a hinged cover. Accordingly, in order to avoid the complex structure such as that taught by Propst and others, wires are run on the underside of the work surface and are brought to the work surface through openings in the work surface.

In order to prevent the wires from sagging on the underside of the work surface and interfering with operations at the work station, various clip means may be employed. However, because the position of the equipment on the desk top frequently changes, there is a need to adjust the location of the wire management clips on the underside of the work surface. Accordingly, the wire management clip must be readily removable yet retain its gripping ability when its location is changed. The wire management clip must also be capable of attachment to the underside of the work surface readily without the need for tools. In addition, in order not to mar the appearance of the work station, the anchoring means of the clips must not protrude above the work surface.

While there are numerous prior art fasteners that would be suitable for use in wire management roles, for various reasons, these clips are unsatisfactory in today's workplace. For example, the fasteners disclosed in U.S. Pat. No. 2,318,853 to Hall; U.S. Pat. No. 2,666,245 to Fernberg; U.S. Pat. No. 3,015,869 to Rapata; U.S. Pat. No. 3,259,347 to Vates; U.S. Pat. No. 3,529,795 to Van Niel; and U.S. Pat. No. 4,375,879 to Kojima; are all unsatisfactory as they each operate only where they may pass completely through the work surface and rely on flanges that would expand over the work surface and prevent removal of the fastener. Fasteners of the type disclosed in these patents mar the work surface and are accordingly not acceptable.

It is an object of the present invention to provide a wire management clip that may be secured in an opening in the underside of the work station surface that does not require that the opening extend from the bottom surface through the work station to the top surface.

It is also an object of the present invention to provide a wire management clip that may be readily removed without the use of tools to adjust the placement of wires on the underside of the work surface.

It is a further object of the invention to provide a wire management clip that retains its gripping ability after long use and does not suffer from fatigue that would cause the clip to loosen and fall from place.

It is a further object of the present invention to provide a rotatable wire management clip that gives the clip maximum flexibility for holding wires.

It is also an object of the present invention to provide a wire management clip that will be able to retain wires of varying diameter.

It is also an object of the present invention to provide a wire management clip that may be secured to an opening in a wall surface or spine of an office system to hold wires.

The other objects and characteristics of the present invention will become apparent from the further disclosure of the invention made hereinafter with reference to the accompanying drawings.

DETAILED DESCRIPTION OF THE INVENTION

Figure 1:
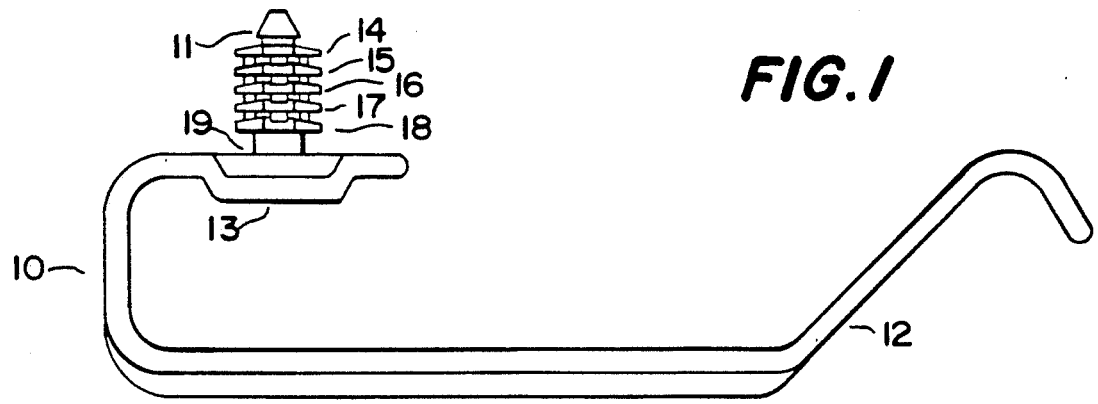
FIG. 1 is a side view of the wire management clip of the present invention.
Figure 2:
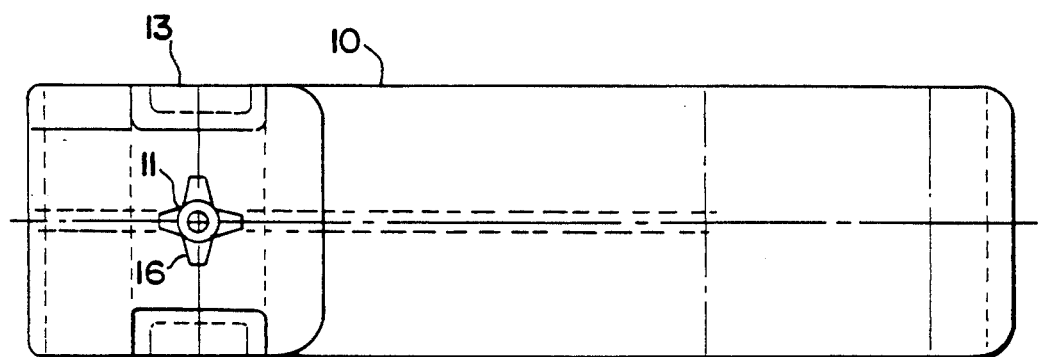
FIG. 2 is a top view of the wire management clip of the present invention.
Figure 3:
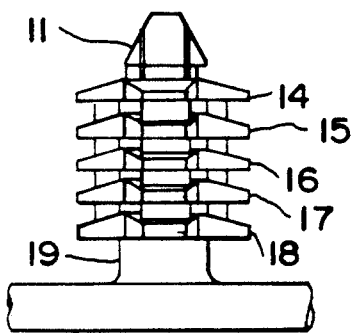
FIG. 3 is an enlarged side view of the insert-like plug member of the present invention.

Referring again to the drawings and particularly FIGS. 1-3, there is illustrated one form of wire management clip 10 of the present invention. As shown, the device includes an insert-like plug member 11 or fastening means adapted to be inserted in an opening in the underside of a work surface. The article further includes a resilient arm 12 preferably capable of holding wires of various diameters.

The insert-like plug member 11 of the present invention projects from the base 13 of the wire management clip and is in the form of a projection having a series of spaced-apart resilient gripping means 14, 15, 16, 17, 18. The gripping means are preferably resilient flanges that emanate vertically from projection 19. The flanges have resilient members 16 and are preferably shaped generally in the form of isosceles trapezoids. The resilient flanges grip the inner surface of the opening in the underside of the work surface. There are preferably five resilient flanges on the projection 19 of insert-like plug member 11 although fewer flanges will also be suitable. Each resilient flange preferably has four generally isosceles trapezoidal-shaped members 16 that are generally equidistantly spaced along the circumference of projection 19. The tip of projection 19 is tapered for ease of insertion into an opening on the underside of the work surface.

In an alternative embodiment of the present invention shown in FIGS. 4-7, the insert-like plug member 21 is preferably in two sections, 22 and 23, that are separated from each other. The tips, 24 and 25 of sections 22 and 23 of the insert-like plug member 21 are tapered for ease of insertion into an opening on the underside of the work surface. At the base 26 and 27 of the tip section, first and second projections 28 and 29 grip the interior surface of the opening on the underside of the work surface to hold the wire management clip in place.

Figure 7:
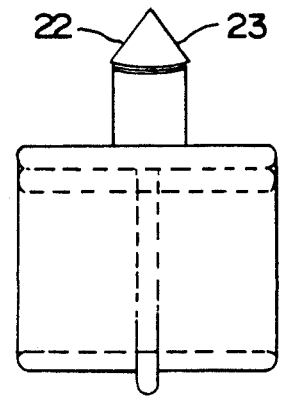
FIG. 7 is a side view of an alternate embodiment of the present invention showing the arrangement of the insert-like plug member upon insertion into an opening on the underside of the work surface.
Figure 4:
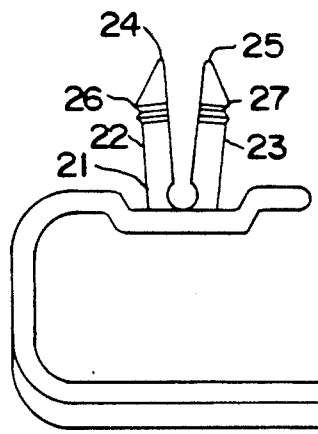
FIG. 4 is a side view of an alternate embodiment of the wire management clip of the present invention.
Figure 5:
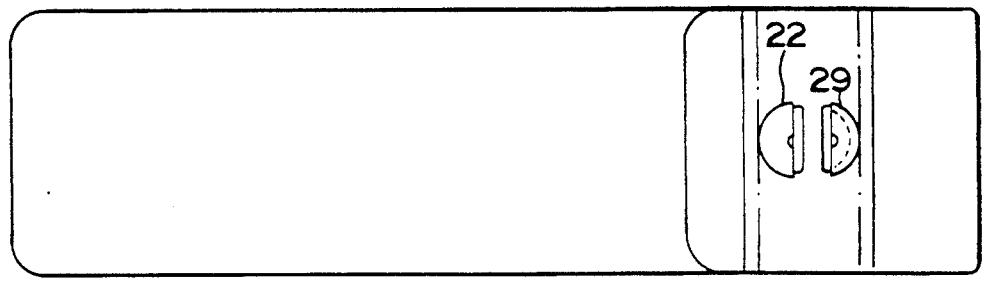
FIG. 5 is a top view of an alternate embodiment of the wire management clip of the present invention.
Figure 6:
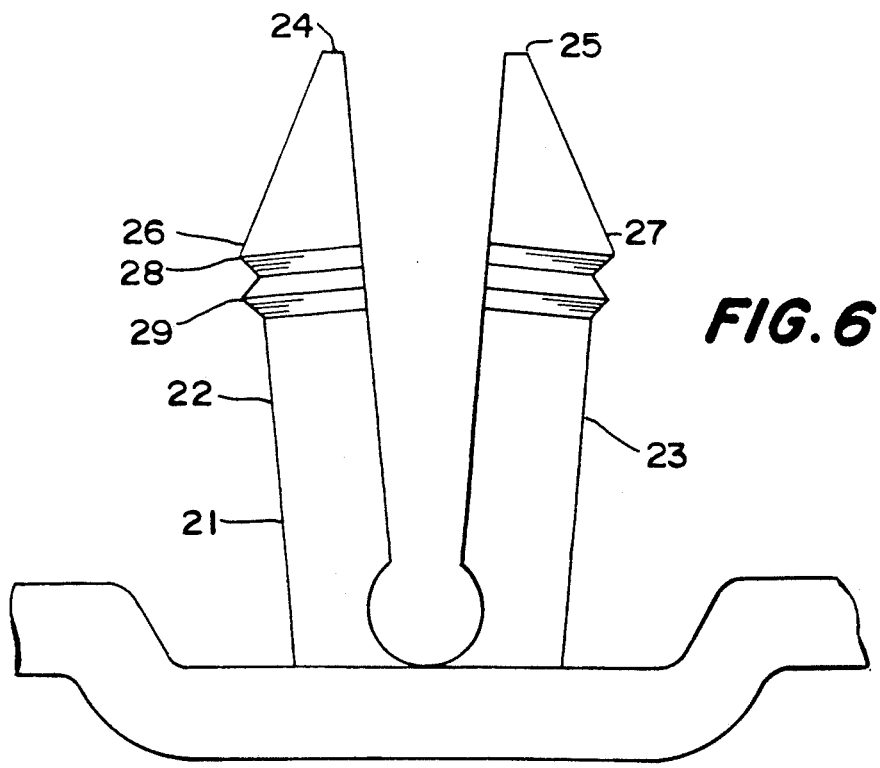
FIG. 6 is a side view of an alternate embodiment showing the insert-like plug member prior to insertion into an opening on the underside of the work surface.

As shown in FIG. 7, when the insert-like plug is inserted into the opening on the underside of the work surface, the two sections, 22 and 23, of the plug are resiliently joined together and the pressure exerted by these two sections in attempting to return to their at-rest position hold the insert-like plug member in the opening on the underside of the work surface.

While the preferred embodiment of the present invention have been shown and described herein, it is obvious that many details may be changed without departing from the spirit and scope of appended claims wherein I claim:

1. A clip comprising a base and an arm extending from said base, said base having a gripping means thereon, said gripping means being capable of exerting a gripping force to a substrate, wherein said gripping means grips the inner surface of the opening in the substrate, said gripping means providing said gripping force without protruding above the surface of said substrate and wherein said gripping force is substantially solely provided to the inner surface of an opening in said substrate said gripping means comprising a projection having a series of spaced apart flanges thereon for gripping the inner surface of the opening in the substrate and wherein each series of said flanges comprises four generally isosceles trapezoidally shaped members generally equidistantly spaced along the circumference of said projection.

2. A wire management clip for use in connection with pre-formed openings in a surface of a substrate comprising:

base and a resilient arm extending therefrom for retaining wires in close proximity to the surface and a gripping means on said base, said gripping means being capable of exerting a gripping force to said substrate, said gripping means providing said gripping force without protruding above the surface of said substrate and wherein said gripping force is substantially solely provided to the inner surface of said opening in the surface of said substrate; said gripping means comprising a projection having a first and second sections which are separated from each other in an at rest position and being capable of being resiliently joined together and exerting pressure against the inner surface of an opening in a substrate, said projection having a series of spaced apart flanges thereon for providing additional gripping force the inner surface of an opening in the underside of the work surface and wherein each series of said flanges comprises four generally isosceles trapezoidally shaped members generally equidistantly spaced along the circumference of said projection.

3. A wire management clip according to claim 2 wherein the pre-formed openings are on the underside of a work surface.

4. A wire management clip according to claim 2 wherein the pre-formed openings are in a wall surface.

* * * * *